March 10, 1959  S. HILLER  2,877,122
METHOD OF DEHYDRATING FISH
Filed Oct. 15, 1953  3 Sheets-Sheet 1
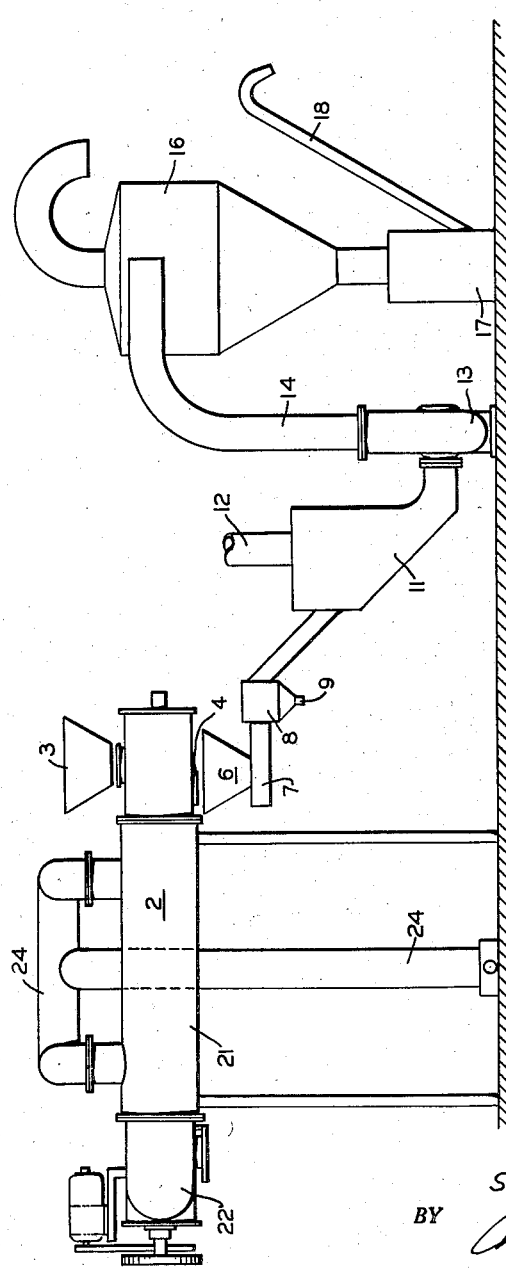
FIG_1
INVENTOR.
STANLEY HILLER
BY
*Charles M. Fryer*
ATTORNEY

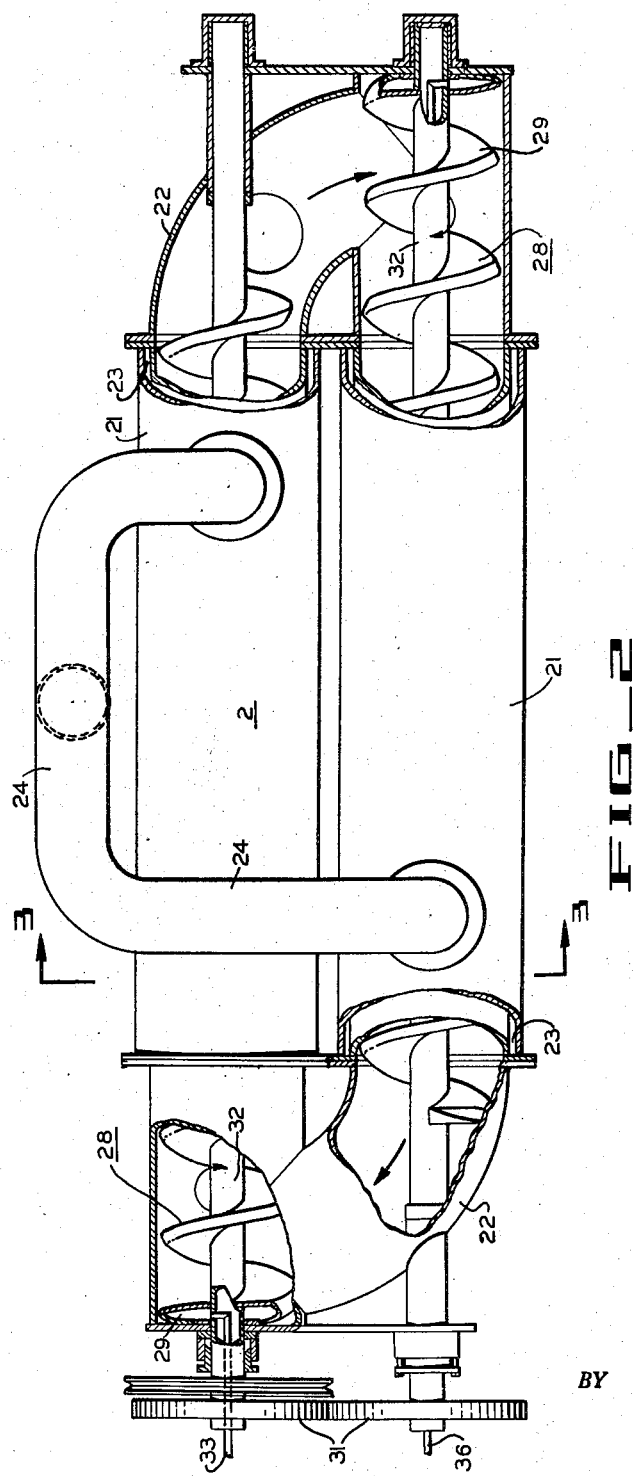

March 10, 1959 S. HILLER 2,877,122
METHOD OF DEHYDRATING FISH
Filed Oct. 15, 1953 3 Sheets-Sheet 3
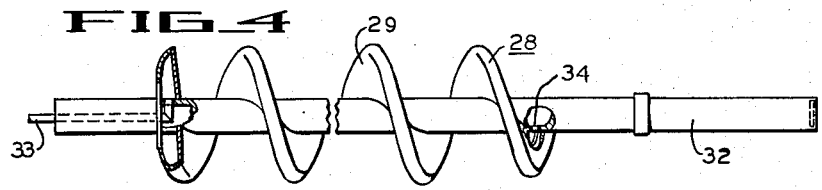
FIG_4
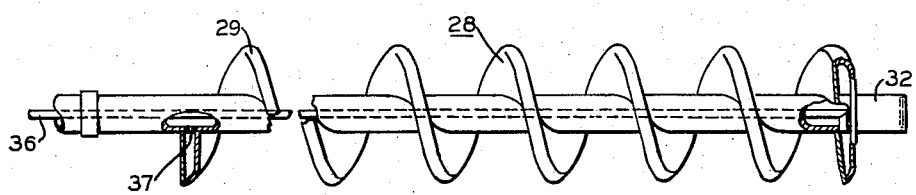
FIG_5
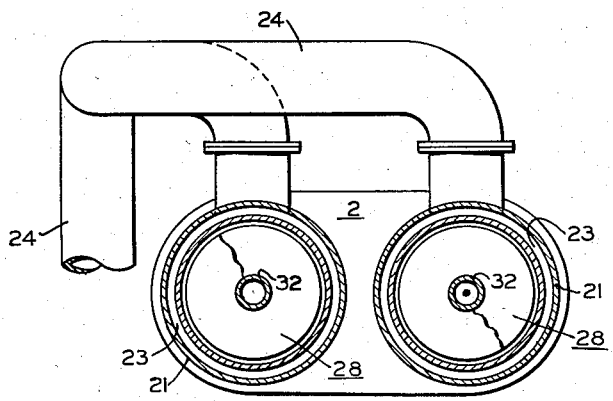
FIG_3
INVENTOR.
STANLEY HILLER
BY
ATTORNEY

United States Patent Office 2,877,122
Patented Mar. 10, 1959

2,877,122
METHOD OF DEHYDRATING FISH

Stanley Hiller, Berkeley, Calif., assignor to Stanley Products Company, San Francisco, Calif., a corporation of California Application October 15, 1953, Serial No. 386,218

3 Claims. (Cl. 99—209)

This invention relates to a method and apparatus for the processing of fish, and more particularly to the processing of fish for the production of fish meal which can be employed as a valuable food product, especially for animals.

Fish processing for the production of meal is widely employed; the meal being a desirable food because of the valuable protein and other constituents in the original fish. Fish oil is also a valuable constituent which is recovered by the processing. In all methods commercially employed, it is the general practice as the first step of the method to cook the fish which is necessary to coagulate the albumens; and the fish is dried or dehydrated by various methods.

Raw fish contains a relatively large amount of moisture, averaging in the order of approximately 60% to 70% by weight, depending upon the type of fish and the time of the year in which the fish is caught. This relatively large amount of moisture has, heretofore, offered a problem in the recovery and separation of oil with a good yield, and retention of valuable constituents in the fish meal. This is so because relatively large and expensive apparatus has heretofore been necessary to handle such type of high moisture containing product. Also, much of the valuable constituents of the fish, particularly so-called stick water (soup), are lost in present commercial operations during the elimination of moisture from the fish for the preparation of the fish meal.

Summarizing this invention, it has as its objects, among others, the provision of a simple and economical method which can be conducted by relatively inexpensive and simple equipment for the processing of the fish, and which at the same time results in a superior fish meal product in which is retained a great proportion of the stick water from the fish. This stick water has heretofore otherwise been lost, or recovered only at great expense. In addition, by the procedure of this invention, a great proportion of so-called gurry, which comprises valuable colloidal particles normally lost in the stick water, is also retained in the fish meal.

Instead of the usual commercial practices of merely cooking the fish to coagulate the albumens while at the same time retaining a considerable amount of moisture in the fish which presents subsequent handling, and stick water and oil recovery problems, or instead of simultaneously cooking and drying or dehydrating the fish down to a relatively low moisture content which deleteriously affects the fish meal, and also presents oil recovery problems, the method of this invention comprises first simultaneously cooking and partially drying or dehydrating the fish to a moisture content intermediate a relatively dry product and a relatively wet product. The amount of dehydration is such that the partially dried and cooked fish contains substantially no visible excess moisture and the fish is fibrous in character.

Reducing the moisture content down to this intermediate point facilitates subsequent pressing for the recovery of oil, and also results in a press effluent relatively light in stick water facilitating separation of the oil. Furthermore, a great amount of valuable stick water remains in the fish when subsequently pressed to express the oil, thus providing an enriched meal. The intermediate moisture content range, according to the procedure of this invention, will be explained more fully hereinafter in the following detailed description.

Another important step in the method of the invention is the preferred manner of simultaneously cooking and partially dehydrating the fish by a simple batch procedure embodying a simple form of apparatus in which the fish is cooked and partially dehydrated by being continuously conveyed in a circuitous closed path while it is simultaneously agitated. It is to be understood, however, that any apparatus and method may be employed to cook and partially dehydrate the fish to the desired intermediate moisture content, whether continuous or batch.

Except for details of the improved dehydrator, the drawings illustrate more or less schematically a form of apparatus for conducting the process of this invention.

In the drawings:

Fig. 1 is a schematic side elevational view of a form of apparatus.

Fig. 2 is a top plan view of the improved dehydrator, with parts broken away and shown in section to illustrate more clearly the construction.

Fig. 3 is a section taken in a plane indicated by line 3—3 in Fig. 2; and

Fig. 4 is a plan view, partly broken away and in section to illustrate more clearly the construction, of one of the feed screws embodied in the dehydrator of Fig. 2.

Fig. 5 is a view similar to Fig. 4 of the other feed screw in such dehydrator.

As previously related, the method hereof comprises the important first step of cooking and partially dehydrating or drying the fish to the desired intermediate moisture content at which the fish can be subsequently easily handled with retention of valuable constituents therein, such as stick water and gurry. Although the moisture content of the original fish may vary in the order of 60% to 70% by weight, the first step is effected, irrespective of the exact amount of original moisture in the fish. When partially dried to such intermediate moisture content, the fish has a fibrous appearance with good sheen and is not wet looking, there being substantially no visible excess moisture. The fish is in the form of discrete masses (not a slush) which can be easily handled by mechanical means, such as conveying mechanism. If the fish should have a relatively high oil content, such as occurs in sardines and herring during their yearly high oil period, the fish will also have an oily appearance when dried to the desired intermediate moisture content.

Although the partially dried fish is non-liquid, it still contains a substantial amount of moisture. From a large number of determinations, it has been found that the moisture content of this cooked and partially dried fish should not be much below 25% by weight of the total weight of the mass; nor should it be much above 40% by weight of the total weight of the mass. From approximately 55% to 85% by weight of the total original amount of moisture in the raw fish is driven off during the partial drying, depending upon the original amount of moisture in the fish.

The moisture in the cooked and partially dried fish is quite important; and for best results, this moisture content should be around 32% by weight of the total weight of the mass, irrespective of the original moisture content of the fish. The extent to which the fish should be cooked and partially dried can be readily ascertained by visual observation in the manner pointed out, but moisture analysis can be made if so desired.

If the moisture content of the cooked and partially dried fish is too high, the following undesirable results occur:

(1) Upon subsequent pressing for the recovery of oil, there is a relatively high loss in stick water and valuable fine colloidal particles (gurry) because of the fluid character of the mass, thus resulting in an inferior fish meal.

(2) Recovery of oil from the effluent with a relatively high stick water and colloidal content is difficult, and requires excessive time and relatively expensive equipment.

(3) Mechanical difficulties are encountered in pressing because of the water load.

(4) The product is messy and difficult to handle.

(5) With a relatively wet product, too great a pressure cannot be exerted by the press, thus impeding recovery of oil.

The following detrimental effects obtain if the fish is cooked and partially dried to too low a moisture content:

(1) Valuable oil is lost for recovery, and remains in the fish through oxidation and overcooking.

(2) The resultant meal containing this oil becomes relatively rancid and dark in color, and is hence not a desirable product.

(3) The yield of oil is considerably decreased because with overdehydration, a greater proportion of oil remains in the cooked and partially dried mass.

(4) To recover oil, the product must be pressed at an excessively high pressure requiring costly equipment, in contradistinction to the relatively inexpensive press equipment that can be used by the procedure of this invention.

With respect to the partial dehydration, the temperature and time required to do this is relatively immaterial, the time being a function of temperature and vice versa, it being only necessary to cook and partially dry to the intermediate moisture content discussed above. Excessive temperatures should not be employed, as they may scorch the fish. A good operating temperature is 212° F., at atmospheric pressure, and lower temperatures under vacuum, although this is not critical. The time required to arrive at the desired intermediate moisture content will also vary depending upon the amount of fish being handled and how thoroughly it is mixed or agitated during the processing. The desired moisture content can be reached in about 2 to 3 hrs. at the preferred temperature operating range and while the fish is simultaneously mixed and agitated.

The preferred procedure for the cooking and partial drying is a batch procedure more fully described hereinafter. However, as previously related, as far as the effect of this cooking and partial drying step is concerned, it may form part of a continuous operation.

After the fish has been cooked and partially dried to the desired intermediate moisture content, the next step is pressing of the mass, which may be done in batches in the form of individual made up cakes placed in a batch operation press, but which however is preferably done in a continuous press. Because of the intermediate moisture content in the mass, the pressing can be effected at a moderate pressure by inexpensive equipment, such pressure being around 100 lbs. per square inch but which may vary from 60 lbs. to 150 lbs. per square inch, depending upon the moisture content actually in the mass.

This pressure is no where near the relatively high pressure that would be required if the mass were relatively dry, such as pressures in the order of 300 lbs. to 400 lbs. per square inch. If very little moisture is driven off from the cooked fish as obtains in some commercial procedures, low press pressures, in the order of about 25 lbs. per square inch are all that can be used because the wet material can not be pressed readily; and the previously mentioned problems exist in subsequent processing.

The mass is pressed until no more effluent escapes from it; and because of the intermediate moisture content, most of the gurry and stick water remain in the mass. Because most of the stick water and gurry remain in the mass, the separation of oil from the press effluent is rendered a very simple operation by conventional means. Some of the stick water and gurry escapes with the press effluent but after separation of the oil therefrom, some or all of the aqueous phase containing such stick water and gurry can be fed back to the partially dried mass if so desired, for the final step of the process when it is further dried, as will be explained later in greater detail.

After the pressing, the resultant press cake is then finally dried in a conventional manner either by hot air drying or at a moderate oven temperature to a point where the moisture content in the mass is approximately 10% to 12% by weight of the total weight of the mass, or less, preferably about 10% by weight of the mass. By law in most jurisdictions, the meal has to be finally dried down to a moisture content of not more than 10% by weight to insure that the meal will not spoil because there is danger of spoilage if the moisture content is above 10%. It is immaterial how low the moisture content is below 10% but it is generally sold with the described moisture content. As related above, in the final drying step, some or all of the press effluent can be incorporated with the pressed material, and dried therewith, thus enriching the meal with any stick water and gurry escaping with the press effluent.

Fig. 1 illustrates a form of apparatus for conducting the overall process of this invention, all of the mechanism being conventional, except the dehydrator 2. Raw fish as it comes from the storage house or from the sea, whichever it may be, is first cooked and partially dried in dehydrator 2, which is of the preferred special construction to be described; the fish being introduced into the dehydrator, by any suitable means, through feed hopper 3. Dehydrator 2 is provided with a valve controlled discharge 4 which is normally closed, but after the fish has been cooked and partially dried to the desired extent, port 4 is opened, and the mass is discharged into hopper 6 from which it is conducted to continuous press 7 of any suitable construction.

Effluent from the press flows into effluent collector 8 from which the effluent discharges from outlet 9. From collector 8, the pressed mass is conducted by suitable conveying means to any suitable cake breaker and mixer 11 where it is broken up by suitable means. As the cake is broken up in the mixer, it is preferably simultaneously further partially dried by means of hot air introduced through piping 12. In this connection, after oil has been removed by conventional procedure from the effluent that has flowed from outlet 9, some or all of the resultant aqueous phase liquid containing some stick water and gurry, may be introduced by any suitable means (not shown) into mixer 11 to enrich the final meal product.

From mixer 11, the now broken press cake mass is conducted to a blower 13 which feeds the same through duct 14 into a conventional type hot air dryer 16 preferably of the so-called cyclone type. The dried meal in the dryer 16 falls into a grinder 17 which divides it into small particles, and from which it is discharged by conveying means 18. It is then subsequently sacked or otherwise packaged by any suitable means (not shown).

Dehydrator 2 which cooks and partially dries the fish comprises side by side cylindrical chambers 21, each pair of the adjacent ends of which is connected together by cross conveyor curved duct portion 22. Each of chambers 21 is provided with a heating medium jacket 23 into which steam is introduced through suitable piping (not shown) to apply heat externally of the mass of fish being dehydrated. Steam condensate is removed through piping 24. The steam introduced into steam jackets 23 may be from any suitable boiler source or from a separate steam generator (not shown).

Journalled for rotation in each of chambers 21 is a feed screw 28, the screw flights 29 of which are hollow for introduction of a steam heating medium throughout the entire screw; the feed screws 28 being rotated by any suitable drive means 31. Shafts 32 of the feed screws are hollow and the upper feed screw as it appears in Fig. 2 (illustrated in Fig. 4) is provided with a steam inlet pipe 33 connected to the left hollow screw flight. As a result, steam can flow through all of the screw flights to apply heat internally of the mass of fish being dehydrated, and condensate can escape from the hollow shaft as the right screw flight of the feed screw is connected to the hollow interior of the drive shaft through orifice 34. Steam can also flow and heat the screw flights of the lower feed screw in Fig. 2 (illustrated in Fig. 5) in a similar manner, through steam inlet pipe 36 connected to the farthest right screw flight and condensate discharge orifice 37 which connects the farthest left screw flight with the hollow interior of the feed screw shaft 32.

Although the provision of a steam jacketed chamber 21 and a steam heated feed screw are old per se for drying, it will be noted from the described arrangement that the screw flights of feed screws 28 are off-set relative to each other at each of the ends of the dehydrator. Hence, as one feed screw is rotated to convey the fish in one general direction and the other rotated to convey the fish in an opposite general direction, fish fed into the apparatus will be continuously conveyed in a circuitous closed path from one chamber 21 into the other, while being simultaneously mixed or agitated by the feed screws as well as being heated to effect dehydration of the fish. In this connection, the curved duct portions 22 cooperate with the ends of the feed screws at each of the ends of the apparatus to convey the material from one chamber 21 into the other.

The off-set relationship of the screw flights and the curved ducts provide a simple construction for obtaining this continual agitation and conveyance of the fish as it is being cooked and partially dehydrated. As an alternative but more complicated arrangement (not shown), the adjacent ends of the feed screw flights could terminate in substantially the same transverse plane, but this would require a more or less complicated cross conveyor system to conduct the fish from one chamber 21 into the other.

In operation of the dehydrator, the fish either whole or cut up as scrap is preferably introduced therein in batches, a large batch being first employed to substantially completely fill the dehydrator; and as moisture loss occurs, smaller batches are introduced into the dehydrator at suitable intervals until no more fish can be loaded therein. For example, it may be filled with a first batch of fish and operated with the steam heat applied. After moisture is lost from the fish during the drying, reduction in volume occurs, and the apparatus may be loaded quickly with another batch of fish; this procedure being continued until there is no further material reduction in volume whereupon the apparatus is operated until the entire mass of fish has arrived at the desired intermediate moisture content which from experience can be determined by visual observation from the factors pointed out above. When all the fish has reached this moisture content, the fish can be discharged from the dehydrator by opening discharge port 4 and it can then be fed continuously and pressed in the press as previously described.

With a total cooking and partial drying time in the order of 2½ hours, and each of chambers 21 having a capacity of about 1000 lbs. of the raw fish, loading of the apparatus in batches starting with 2000 lbs., and then adding batches as loss of moisture gives more space will generally take about an hour. In this manner of batch loading, approximately 3000 lbs. of fish can be processed in substantially the same time it would otherwise take to process 2000 lbs. Although the described dehydrator is preferably operated by being loaded in batches, it can be loaded and operated without adding additional fish. However, this is not as desirable because as the fish shrinks upon loss of moisture, full use of the dehydrator capacity is not employed and this reduces production. The following is a typical example illustrating the mode of procedure of the invention in which the preferred batch dehydration is effected.

2000 lbs. of waste fish from a fish market consisting of the heads, bones, entrails and fins of a mixture of salmon, sea bass, sand dabs and flounders was employed. The average original moisture content of the fish was found to be 62% by weight of the total mass, and the average oil content approximately 7.5% by weight of the total mass.

Steam was introduced into the combined cooker and dryer which brought the material to a temperature of approximately 212° F. Additional batches of the raw fish were fed into the apparatus in amounts of approximately 250 lbs. each, during the course of an hour while the apparatus was maintained heated at this temperature. The total amount of fish added was 3000 lbs. After the apparatus had been substantially completely loaded, the entire mass was further cooked and partially dried at the 212° F. temperature for a period of 1½ additional hours, making a total time of 2½ hours. During all this time the fish was substantially continuously conveyed in the closed circuitous path and agitated by the feed screws.

After the mass had all been partially dehydrated to the intermediae moisture content described above, it was then discharged from the dehydrator, and promptly pressed in a continuous press applying 100 lbs. per sq. in. pressure, and then subsequently treated for recovery of oil and further drying in the manner previously related. The moisture content of the cooked and partially dehydrated fish was found to average 32% by weight of the total mass of the fish on the basis of numerous determinations, and the oil content was found to average approximately 14% by weight of the total weight of the mass. The resultant press cake averaged 23% by weight moisture and 4% by weight oil.

The effluent from the press was then promptly treated in a conventional manner common in fish processing to separate the oil from the remaining liquid; and all the aqueous phase was run back into the press cake and thoroughly mixed therewith in the heated mixer. Then, the cake was dried under agitation in a cyclone type air dryer to a moisture content of 10% by weight; the total residence time in the heated mixer and dryer being about five minutes at approximately 175° F.

Finally, the meal was ground and upon analysis, it was found to average 10% by weight moisture and 7.75% by weight fat and oil.

I claim:

1. The method of processing fish for the production of fish meal which comprises first cooking and partially dehydrating the fish to an intermediate moisture content in the order of 25% to 40% by weight of the total weight of the partially dehydrated mass at which the fish contains substantially no visible excess moisture and the resultant partially dehydrated mass is fibrous in character, such cooking and partial dehydration being effected by continuously conveying the fish in a circuitous closed path in an enclosed zone while simultaneously agitating and applying heat internally and externally of the zone as the fish is thus conveyed; said conveying and agitation of the fish being effected by continuously imparting a helical motion to said fish as it is continuously moved along said path to subject substantially all of the fish to said external as well as said internal heat as the fish is conveyed; pressing said partially dehydrated mass of fish; and subsequently further drying the same to a moisture content below about 12% by weight of the dried mass.

2. The method of processing fish for the production of fish meal which comprises first cooking and partially dehydrating the fish to an intermediate moisture content in the order of 25% to 40% by weight of the total weight of the partially dehydrated mass at which the fish contains substantially no visible excess moisture and the resultant partially dehydrated mass is fibrous in character, such cooking and partial dehydration being effected by continuously conveying the fish in a circuitous closed path in an enclosed zone while simultaneously agitating and applying heat internally and externally of the zone as the fish is thus conveyed; said conveying and agitation of the fish being effected by continuously imparting a helical motion to said fish as it is continuously moved along said path to subject substantially all of the fish to said external as well as said internal heat as the fish is conveyed; loading said zone with batches of fish to make up for reduction in volume of the fish resulting from loss of moisture; pressing said partially dehydrated mass of fish; and subsequently further drying the same to a moisture content below about 12% by weight of the dried mass.

3. The method of processing fish for the production of fish meal which comprises first cooking and partially dehydrating the fish to an intermediate moisture content of about 25% to 40% by weight of the total weight of the resultant partially dehydrated mass to cause the fish to contain substantially no visible excess moisture and the resultant partially dehydrated mass to be fibrous in character, such cooking and partial dehydration being effected by continuously conveying the fish in a circuitous closed path in an enclosed zone while simultaneously agitating and applying heat within and externally of the zone as the fish is thus conveyed; said conveying and simultaneous agitation of the fish being effected by continuously imparting a helical movement to the fish substantially along the entire length of said path, and said heat within said zone being applied internally of the mass of fish as it is thus helically moved to subject substantially all of the fish to said external as well as said internal heat; pressing said partially dehydrated mass of fish; and subsequently further drying the same to a moisture content below about 12% by weight of the dried mass.

References Cited in the file of this patent
UNITED STATES PATENTS

| | | |
|---|---|---|
| 1,413,200 | Thompson | Apr. 18, 1922 |
| 1,489,702 | Hare | Apr. 8, 1924 |
| 1,489,940 | Hiller | Apr. 8, 1924 |
| 1,994,343 | Graves | Mar. 12, 1935 |
| 2,419,875 | Birdseye | Apr. 29, 1947 |

FOREIGN PATENTS

| | | |
|---|---|---|
| 247,437 | Great Britain | Feb. 18, 1926 |
| 382,085 | Great Britain | Oct. 20, 1932 |
| 313,843 | Italy | Jan. 9, 1934 |